United States Patent [19]

Boutin et al.

[11] Patent Number: 5,118,468

[45] Date of Patent: Jun. 2, 1992

[54] METHOD OF MAKING A METAL, NEUTRON ABSORBING ELEMENT AND THE ELEMENT OBTAINED

[75] Inventors: Jean Boutin, St. Martin d'Hères; Luc Moulin, Paris, both of France

[73] Assignee: Compagnie Europeenne Du Zirconium Cezus, Courbevoie, France

[21] Appl. No.: 382,582

[22] Filed: Jul. 20, 1989

[30] Foreign Application Priority Data

Jul. 28, 1988 [FR] France ................ 88 10449

[51] Int. Cl.⁵ .................................................. G21C 7/24
[52] U.S. Cl. ...................... 419/66; 376/339; 420/422
[58] Field of Search ............... 419/66, 68; 376/327, 376/339; 420/422, 423

[56] References Cited

U.S. PATENT DOCUMENTS

| 3,234,104 | 2/1966 | Gale et al. ............ | 376/327 |
| 4,259,413 | 3/1981 | Taglang et al. ....... | 376/339 |
| 4,566,989 | 1/1986 | Radford et al. ....... | 376/339 |

FOREIGN PATENT DOCUMENTS

| 3437112 | 5/1985 | Fed. Rep. of Germany . | |
| 1227586 | 8/1960 | France . | |
| 1503207 | 12/1966 | France . | |
| 877370 | 9/1961 | United Kingdom ......... | 376/327 |
| 926136 | 5/1963 | United Kingdom ......... | 376/412 |
| 1095925 | 12/1967 | United Kingdom ......... | 420/422 |

OTHER PUBLICATIONS

Kuwae et al, "Development of Zircaloy Clad Hafnium Rods for BWR Long Life Neutron Absorbers", Journal of Nuclear Science and Technology, vol. 23, No. 2, Feb. 1986, pp. 185-187.

Primary Examiner—Stephen C. Bentley
Attorney, Agent, or Firm—Dennison, Meserole, Pollack & Scheiner

[57] ABSTRACT

The subject of the invention is a method of making a clad metal, neutron absorbing element, and the neutron absorbing element produced by preparing compactable metal products comprising (weight %) HF at least 25%, Zr and/or Zr alloys=0 to 75%; Ti and/or Ti alloys=0 to 75%; Hf-ZR alloys containing <55% Zr=0 to 75%; Hf-Ti alloys containing <55% Ti=0 to 75%; neutron absorbing metal elements melting at over 400° C.: <0.2% and other metal elements melting at over 400° C.: 0 to the balance, the balance being less than 5%; introducing at least some of these products into a metal container with an open end; compressing the products in the container, or compressing them before putting them into the container; if necessary repeating the introduction and compression of the products until the container is at least 95% full; and closing the open end of the container by welding on a metal lid or plug and providing an internal vacuum. The element is used, e.g., as a component of a control arrangement in a nuclear reactor.

21 Claims, 1 Drawing Sheet

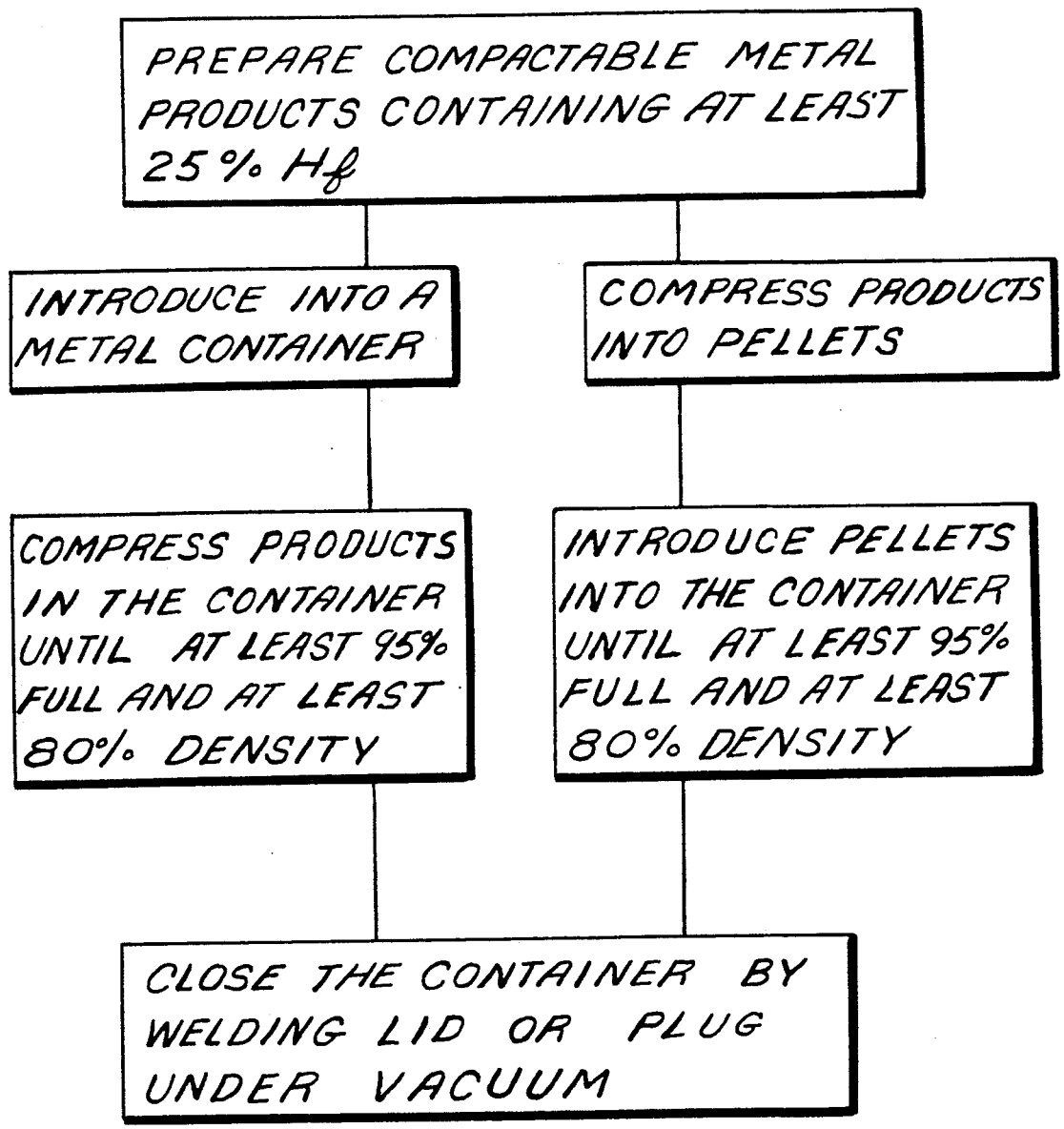

METHOD OF MAKING A METAL, NEUTRON ABSORBING ELEMENT AND THE ELEMENT OBTAINED

The invention concerns a method of making a neutron absorbing element, for use e.g. as a component of a control rod for a nuclear reactor using water, and the neutron absorbing element obtained.

The article "Development of Zircaloy Clad Hafnium Rods for BWR Long Life Neutron Absorbers", by R. KUWAE-M.OBATA-K.SATO-S.SHIMA-J of Nuclear Science and Technology, 23(2), pages 185-187 (Feb. 1986), describes the manufacture of zircaloy clad hafnium rods to replace neutron absorbers based on boron carbide and reminds the reader that Hf is a more durable neutron absorber than boron carbide.

The manufacture of a hafnium rod is a complex process, starting with fusion under vacuum and continuing with hot then cold finishing processes, with heat treatments. The cladding of such a rod with zircaloy 2, described in the above article, is also complicated and expensive.

Applicants have sought to develop a hafnium based absorbing element which is simpler to produce and more economical.

DESCRIPTION OF INVENTION

The first subject of the invention is a method of making a metal, neutron absorbing element for use in a control arrangement of a nuclear reactor, the element comprising hafnium and being covered with a cladding which is hardly absorbent or non-absorbent to said neutrons. According to the invention the method comprises the following operations:

a) preparing metal products comprising (weight %) per type of element or alloy:
  Hf—at least 25%
  Zr and/or Zr alloys=0 to 75%
  Ti and/or Ti alloy=0 to 75%
  Hf-Zr alloys containing <55% Zr=0 to 75%
  Hf-Ti alloys containing <55% Ti=0 to 75%
  neutron absorbing metal elements melting at over 400° C.: <0.2% and preferably less than 0.1%
  other metal elements melting at over 400° C.: 0 to the balance, the balance being less than 5%;
b) introducing at least some of these products into a metal container with an open end;
c) compressing said products in the container, or compressing them before putting them into the container;
d) if necessary repeating the introduction and compression of the products until the container is at least 95% full, with the apparent density of the compressed products at over 80% of their density in the solid state;
e) closing the open end of the container by welding on a metal lid or plug and providing an internal air vacuum better than 1.3 Pa ($=10^{-2}$ mm of mercury), by a method such as electron bombardment, laser welding or arc welding under argon with sealing, with the inside of the container put under vacuum or under a neutral gas such as helium.

The absorbing elements according to the invention are thus entirely metallic. The compactable metal products particularly comprise crystals and/or chips and/or sponge. The term "crystals" here refers to electrolytic metal deposits, the term "chips" to metal fragments formed in machining operations such as turning, milling or boring and possibly small scrap with a unit volume generally less than 1 cubic cm, while the term "sponge" refers to products obtained by magnesium reduction or Kroll reduction in the case of Hf, Zr and Ti.

The hafnium used preferably comprises electrolytic crystals representing at least 25% of the total weight of products and with a mean H content and a mean Cl content of respectively less than 40 ppm and 50 ppm.

The products used may further comprise electrolytic crystals of Zr and/or Ti, again with a hydrogen and a chlorine content of respectively less than 40 ppm and 50 ppm, possibly in addition to the electrolytic Hf crystals.

The electrolytic Hf crystals deserve special attention, since they preferably make up all or an important part of the charge forming the interior of the neutron absorbing element of the invention. They typically have a settled apparent density of from 2 to 6 g/cm³, with a variable individual size of from 0.1 mm to 3 mm or 4 mm, with a solid or needle like appearance according to the electrolytic conditions. They are often grouped in aggregates, representing the simultaneous growth of dendrites or needles along a plurality of crystallographic axes. The size of these aggregates is then typically from 3 mm to 2 cm. The largest aggregates are either removed for this use or fragmented, e.g. by grinding, to return to a smaller size, typically less than 0.5 to 0.3 times the diameter or thickness of the compacted product to be obtained.

On leaving the electrolytic process, which typically took place in a bath of molten chlorides, the hafnium crystals are usually washed and dried. Their H and Cl content at this stage, generally respectively less than 40 and 50 ppm, may be lowered to less than 25 to 30 ppm by carefully controlling the electrolytic conditions and possibly also by more extensive drying than drying in ambient air: they may be dried at from 150° to 300° C. in a vacuum higher than 1.3 Pa or in an inert gas.

The purification from H and Cl can be taken still further by subjecting the electrolytic crystals to treatment for 8 to 48 hours at from 1000° to 1250° C. and typically for 16 to 32 hours at from 1050° to 1150° C., at a vacuum higher than one mPa instead of the treatment at from 150° to 300° C. the residual content of H and Cl is then respectively less than 20 ppm and less than 10 ppm.

The same treatments may be applied separately or simultaneously when electrolytic crystals of Zr and/or Ti are also used. Various pure metals and alloys may be chosen to form the charge, according to the required linear density of Hf and the desired weight of the element and also dependent on availability. Thus the inside of the element may contain from 25 to 100% Hf, and the element may, for example, be made as light as possible by using crystals or chips of Ti or alloy.

Electrolytic hafnium crystals are particularly suitable for compression, mainly because of the high proportion of cavities in them, resulting in a low settled apparent density. Compression may be carried out at two possible stages:

either before insertion in the cladding container: in this case the compactable products have been mixed, homogenised if appropriate, and compressed e.g. in pellet form; they can be put into the container with a slight clearance, typically less than 0.5 mm of the diameter;

or after insertion in the container, generally in a plurality of stages; in which case compression is generally effected at least twice with an instrument passed into the container, preferably with a small clearance.

When pellets are used, the pellets placed in the container may be recompressed.

The filling of the container and compression are generally controlled so that a free internal height of less than 3 mm and preferably less than 1 mm is left when the plug or lid to be welded onto the container is put into position. The apparent density of the compressed products is over 80% of their mean density in the solid state and typically from 85 to 95% thereof.

The products are usually mixed before being compressed or placed in the metal container. In this way the variations in the weight of hafnium per unit length or per unit useful surface area along the closed container or element are less than 2 relative percent or even less than one relative percent.

The content or density of hafnium may vary along the absorbing element when this is desirable. This can be provided for by one of the two following methods;

by preparing pellets from batches of products which differ in their hafnium content, and by piling them into the container to give a hafnium content which varies discretely along the element formed by the closed container.

by placing hafnium and possibly alloy containing hafnium in the container in one or more sequences, in quantities which increase continuously from one end of the container to the other, while at the same time inserting decreasing quantities of metal or alloy containing less hafnium, and by compressing them together after each inserting sequence or at the end of the operation before closing the end of the container. The content or surface density of hafnium is thus made to vary continuously along the absorbing element.

The metal container and its lid are made of any metal alloy which will have sufficient corrosion resistance in the reactor at about 350° C. A stainless steel, preferably a low carbon or stabilised austeno-ferritic steel, for example an AISI 316L, is particularly appropriate in its corrosion resistance, weldability and suitability for shaping as a container. The metal or alloy for the container can also be selected by reference to the metal or alloy used in the structure of the control arrangement, according to the fixing method envisaged for the absorbing element according to the invention.

It will be noted that the nature of the container and its contents make it possible to change the shape of the absorbing element formed by the filled and closed container, by moderate cold shaping or warm shaping at less than 250° C. This may e.g. lengthen the container by less than 30% or change its width so that it can be fixed on the control arrangement.

The second subject of the invention is the metal, neutron absorbing element obtained; it is filled with compacted metal products comprising at least 25% of electrolytic Hf crystals of easily recognised shapes. The local hafnium content may vary in steps along the element; alternatively it may vary continuously from one end to the other, typically by at least 10 relative percent. In addition to the hafnium crystals and possibly chips, and e.g. as a means of adjusting the weight, the element may also contain at least 20% of crystals or chips of Zr or alloy and/or Ti or alloy. A portion of the Hf, Ti and/or Zr elements may be in sponge form.

ADVANTAGES OF INVENTION

There are many:
preferred use of pure Hf (electrolytic crystals) without any complex and expensive conversion;
flexibility with regard to sources of metals or alloys;
ease in adjusting the weight of Hf;
possibility of varying the Hf content along the element;
possibility of modifying the total mass for a given mass of Hf contained;
simple manufacturing process.

BRIEF DESCRIPTION OF THE DRAWINGS

The sole drawing Figure is a flow chart illustrating the steps of the invention.

EXAMPLES

The following examples illustrate some aspects of the invention.

EXAMPLE 1

A stainless steel tube (AISI 316L) is used, thickness 0.8 mm, inside diameter 2.5 mm, length 1000 mm, sealed at the lower end by a welded plug 10 mm high. The tube is kept vertical for filling.

625 g of electrolytic Hf crystals is inserted in three stages, each insertion being followed by pressing by a needle with a flat end 8.2 mm in diameter. The final level of the compressed crystals is about 5.5 mm below the opening at the end of the container. The plug 10 mm high is then put into position without any difficulty, leaving an average clearance of 0.5 mm below it. It is welded on in the usual way with the interior under vacuum, by lateral welding across the end of the tube.

In this example the sealed container is 98% full and the apparent density of the layer of compressed Hf crystals is about 85%.

EXAMPLE 2

The tube used is identical with than in Example 1 except for its length, which is 1400 mm.

75 pellets, 8.2 mm in diameter and with a unit height of 20 mm, are prepared from equal fractions of a mixture of:
electrolytic Hf crystals: 207 g (37.5%)
zircaloy 4 chips: 345 g In the precompressed state the apparent total volume of the pellets is 79.2 cm$^3$ and their total theoretical volume, derived from the specific weights, is 207/13.29+345/6.5=68.65 cm$^3$. The apparent density of the compressed crystals and chips is thus 86.7%.

40 pellets are placed in the tube and a first recompression is carried out, reducing their total height by about 10 mm by making them wider and denser. The other 35 pellets are placed in the tube and recompression is continued at a slightly higher pressure, bringing the upper level of the last pellet to about 5.5 mm from the open end of the container. In this state, with the pellets slightly wider and crushed, the apparent density or relative density of the compressed crystals and chips is 88%.

The plug is positioned and welded as before.

EXAMPLE 3

The tube used is identical with that in Example 2. The same types and quantities of compactable products are used, although they are divided up differently in three batches of the same weight, 184 g:

first batch: Hf crystals 60 g (32.5%)-zircaloy chips 124 g.

second batch: Hf crystals 69 g (37.5%)-zircaloy chips 115 g.

third batch: Hf crystals 78 g (42.5%)-zircaloy chips 102 g.

Equal fractions by weight of each of the batches are used to prepare 26 pellets for the first batch, 25 for the second and 24 for the third.

The 26 pellets of the first batch are placed in the tube and a first recompression process is carried out. The 25 pellets of the second batch are placed in it and further recompression is effected, then the 24 pellets of the third batch are inserted, and the final recompression and sealing are carried out as in Example 2.

The absorbing element obtained has the same weight of Hf as the element in Example 2, but in three portions with different Hf content.

We claim:

1. A method for forming a metal, neutron absorbing element for control of a nuclear reactor, comprising the steps of:
   a) preparing a compactable metal product consisting essentially of, by weight:
      at least 25% Hf;
      0–75% Zr and/or Zr alloys;
      0–75% Ti and/or Ti alloys;
      0–75% Hf-Zr alloys containing <55% Zr;
      0–75% Hf-Ti alloys containing <55% Ti;
      <0.2% neutron absorbing metallic elements melting at over 400° C.; and
      <5% other metallic elements melting at over 400° C.
   b) introducing said compactable metal product into a substantially neutron non-absorbing metal container through an open end;
   c) before said introducing step, compacting said metal product outside of said container, and/or during and/or after said introducing step, compacting said metal product in said container through said open end,
      said metal product being compacted to a density of at least 80% of its mean, solid state density with said container being at least 95% full; and
   d) placing said compacted metal product under a vacuum better than 1.3 Pa, and sealing said open end by welding a metal lid or plug thereto.

2. The method of claim 1, wherein the hafnium used comprises electrolytic crystals representing at least 25% of the total weight of products, the crystals having a hydrogen and a chlorine content respectively less than 40 ppm and 50 ppm.

3. The method of claim 2, wherein the products used comprise electrolytic crystals of Zr and/or Ti, with a hydrogen and a chlorine content respectively less than 40 ppm and 50 ppm.

4. The method of claim 1 wherein the products used comprise electrolytic crystals of Zr and/or Ti, with a hydrogen and a chlorine content respectively less than 40 ppm and 50 ppm.

5. The method of claim 4, wherein the electrolytic crystals used have a mean hydrogen and chlorine content respectively less than 25 and 30 ppm.

6. The method of claim 2, wherein the electrolytic crystals used have a mean hydrogen and chlorine content respectively less than 25 and 30 ppm.

7. The method of claim 6, wherein the electrolytic crystals used have been treated previously at from 150° to 300° C., under vacuum or in an inert gas.

8. The method of claim 4, wherein the electrolytic crystals used have been treated previously, for 8 to 48 hours at from 1000° to 1250° C.

9. The method of claim 8, wherein the electrolytic crystals have been treated previously, for 16 to 32 hours at from 1050° to 1150° C.

10. The method of any of claims 1, 2, 4 or 6–8, wherein the compactable products are mixed before being compressed and/or placed in the metal container, so that the variations in the weight of Hf per unit length or per unit useful surface area obtained along the sealed container or element are less than 2 relative percent.

11. The method of claim 10, wherein the metal container and its lid are made of stainless steel.

12. The method of claim 10, wherein the element or filled container is expanded or shaped by cold forming or forming at below 260° C.

13. The method of any of claims 1, 2, 4 or 6–8, wherein discrete variations in the Hf content along the sealed container or element are produced, by preparing pellets from batches of compactable products with a different Hf content before placing them in the container.

14. The method of claim 13, wherein the metal container and its lid are made of stainless steel.

15. The method of claim 13, wherein the element or filled container is expanded or shaped by cold forming or forming at below 260° C.

16. The method of any of claims 1, 2, 4 or 6–8, wherein continuous variation of the Hf density along a container is produced, by inserting Hf and/or alloy containing Hf in the container in one or more stages, in quantities increasing continuously from one end of the container to the other, while simultaneously inserting a decreasing quantity of metal or alloy containing no Hf or less Hf, and by compressing them after each inserting sequence or at the end of the operation before sealing the end of the container.

17. The method of claim 16, wherein the metal container and its lid are made of stainless steel.

18. The method of claim 16, wherein the element or filled container is expanded or shaped by cold forming or forming at below 260° C.

19. The method of any of claims 1, 2, 4 or 6–8 wherein the metal container and its lid are made of stainless steel.

20. The method of claim 19, wherein said stainless steel is AISI 316L.

21. The method of any of claims 1, 2, 4 or 6–8 wherein the element or filled container is expanded or shaped by cold forming or forming at below 260° C.

* * * * *